(12) United States Patent
Vautrin et al.

(10) Patent No.: US 8,799,514 B1
(45) Date of Patent: Aug. 5, 2014

(54) ALLOCATING PORT RANGES

(75) Inventors: Olivier Vautrin, Foster City, CA (US);
Reinaldo Penno, San Jose, CA (US);
Rajesh Mohan, Cupertino, CA (US);
Sarat Kamisetty, Fremont, CA (US);
Alain Durand, Great Falls, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 209 days.

(21) Appl. No.: 13/247,014

(22) Filed: Sep. 28, 2011

Related U.S. Application Data

(60) Provisional application No. 61/503,505, filed on Jun. 30, 2011.

(51) Int. Cl.
*G06F 15/16* (2006.01)
(52) U.S. Cl.
USPC ............ 709/245; 709/224; 709/228; 370/392

(58) Field of Classification Search
USPC ............................ 709/245, 224, 228; 370/392
See application file for complete search history.

(56) References Cited

U.S. PATENT DOCUMENTS

| | | | |
|---|---|---|---|
| 2005/0265252 A1* | 12/2005 | Banerjee et al. | 370/252 |
| 2010/0303078 A1* | 12/2010 | Karir | 370/392 |
| 2011/0271112 A1* | 11/2011 | Bajko et al. | 713/168 |
| 2012/0027008 A1* | 2/2012 | Chou | 370/352 |
| 2012/0173718 A1* | 7/2012 | Quittek et al. | 709/224 |
| 2012/0179830 A1* | 7/2012 | Ait-Ameur et al. | 709/228 |
| 2013/0329735 A1* | 12/2013 | Yamazaki et al. | 370/392 |

* cited by examiner

*Primary Examiner* — Michael C Lai
(74) *Attorney, Agent, or Firm* — Harrity & Harrity, LLP

(57) ABSTRACT

A network device may receive a packet from a user device; allocate a first port range to the user device; measure a period of time after allocating the first port range; and allocate a second port range to the user device when the measured period of time is equal to a particular period of time. The first port range may be associated with a first Internet Protocol (IP) address.

20 Claims, 6 Drawing Sheets

| IP ADDRESS | START PORT RANGE | END PORT RANGE | STATUS |
|---|---|---|---|
| 172.16.254.1 | 2000 | 2499 | ALLOCATED |
| 172.16.254.1 | 2500 | 2999 | NOT ALLOCATED |
| 172.16.254.1 | 3000 | 3499 | NOT ALLOCATED |
| 172.16.254.1 | 3500 | 3599 | NOT ALLOCATED |
| 172.16.254.2 | 2000 | 3600 | NOT ALLOCATED |
| ... | ... | ... | ... |

400 → 
410 → IP ADDRESS
420 → START PORT RANGE
430 → END PORT RANGE
440 → STATUS

Fig. 4A

| IP ADDRESS | START PORT RANGE | END PORT RANGE | STATUS |
|---|---|---|---|
| 172.16.254.1 | 2000 | 2499 | ALLOCATED |
| 172.16.254.1 | 2500 | 2999 | NOT ALLOCATED |
| 172.16.254.1 | 3000 | 3499 | ALLOCATED |
| 172.16.254.1 | 3500 | 3599 | NOT ALLOCATED |
| 172.16.254.2 | 2000 | 3600 | NOT ALLOCATED |
| ... | ... | ... | ... |

Fig. 4B

| IP ADDRESS | START PORT RANGE | END PORT RANGE | STATUS |
|---|---|---|---|
| 172.16.254.1 | 2000 | 2499 | NOT ALLOCATED |
| 172.16.254.1 | 2500 | 2999 | NOT ALLOCATED |
| 172.16.254.1 | 3000 | 3499 | ALLOCATED |
| 172.16.254.1 | 3500 | 3599 | NOT ALLOCATED |
| 172.16.254.2 | 2000 | 3600 | NOT ALLOCATED |
| ... | ... | ... | ... |

Fig. 4C

ALLOCATING PORT RANGES

BACKGROUND

A network service provider allocates an Internet Protocol (IP) address for connections between a particular subscriber of a network service, associated with a user device (e.g., a computer, a mobile phone device, etc.), and web service(s). An increase in the number of network (e.g., Internet) users is causing a rapid depletion of available unallocated IP addresses (e.g., IP Version 4 (IPv4) address exhaustion, IP Version 6 (IPv6) address exhaustion).

To counter depletion of IP addresses, network service providers use network address translation (NAT) to share a public IP address among a number of different subscribers. Government regulations require network providers to store binding history between IP addresses, ports, and user devices to assist law enforcement agencies with Internet-related investigations. The binding information may become very large and costly for a network service provider to store.

In order to minimize the amount of binding information that needs to be stored, network service providers allocate a continuous port range to a subscriber instead of allocating an individual port for each session associated with the subscriber. Allocating contiguous port ranges instead of allocating individual ports per sessions allows the network subscriber to only store information for the ranges. However, allocating a static port range to a particular subscriber substantially increases the particular user's susceptibility to security attacks because the static port range makes it easier for an attacker to guess (e.g., pinpoint) one of the particular ports, in the static range, that is being used by a subscriber.

SUMMARY

According to one aspect, a method may include: receiving, by a network device, a packet from a user device; allocating, by the network device, a first port range, associated with a first Internet Protocol (IP) address, to the user device; measuring, by the network device, a period of time after allocating the first port range; and allocating, by the network device, a second port range to the user device when the measured period of time is equal to a particular period of time.

According to another aspect, a non-transitory computer-readable medium may store a program for causing a computing device to perform a method. The method may include: allocating a first port range, associated with a first IP address, to a device; allocating a second port range to the device when a measured period of time is equal to a particular period of time; and migrating sessions from the first port range to the second port range.

According to yet another aspect, a network device may include a processor and a memory. The memory may store a particular period of time and a port range size. The processor may allocate a first port range to a user device; measure a period of time; determine whether the measured period of time is equal to the particular period of time; and allocate a second port range to the user device when the measured period of time is equal to the particular period of time. A first quantity of ports in the first port range may equal the port range size. A second quantity of ports in the second port range may equal the port range size

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A-4C are diagrams illustrating an example table that indicates which port ranges are allocated.

DETAILED DESCRIPTION

The following detailed description refers to the accompanying drawings. The same reference numbers in different drawings may identify the same or similar elements.

A packet may refer to and be used interchangeably with a request, a message, a ping, traffic, data, a datagram, or a cell; a fragment of a packet, a fragment of a datagram, a fragment of a cell; or another type, arrangement, or packaging of data. A packet may include protocol header(s), such as a Transmission Control Protocol (TCP) header, a User Datagram Protocol (UDP) header, etc.

A session may refer to a connection, via one or more networks, between a user device and a server that provides a web or network service. The user device and the server may use the session to exchange one or more packets.

Network address translation (NAT) may refer to a process of modifying IP address information in headers of packets while transmitting the packets via a network. NAT may include allocating an IP address and a port range to a subscriber. NAT may further include storing binding information. The binding information may include information associated with a private IP address, one or more ports (e.g., a port range) associated with the private IP address, a unique public IP address, a device identifier, etc.

A port may refer to an application-specific and/or a process specific software construct that serves as a communications endpoint. The port may be identified by a port number (e.g., a 16-bit unsigned integer that ranges from 0 to 65535), an IP address, and/or a type of transport protocol (e.g., TCP, UDP, etc.). NAT may allocate a port range by reserving port numbers associated with the ports in the port range.

An implementation described herein may modify which port range is allocated to a user device in order to increase security of the user device while using NAT. A network device may allocate an initial port range to a user device when the user device connects to a network associated with the network device. The network device and/or one or more other network devices may use ports in the initial port range to establish sessions, via the network, between the user device and one or more web services. After a particular period of time, the network device may allocate a new port range to the user device. Thereafter, the network device may release ports from the initial port range and establish sessions, via the network, between the user device and one or more web services by using ports of the new port range. After the particular period of time passes again, the network device may allocate another new port range to the user device. The network device may continue repeating the process until the user device disconnects from the network and all ports associated with the user device are released.

Figure 1:
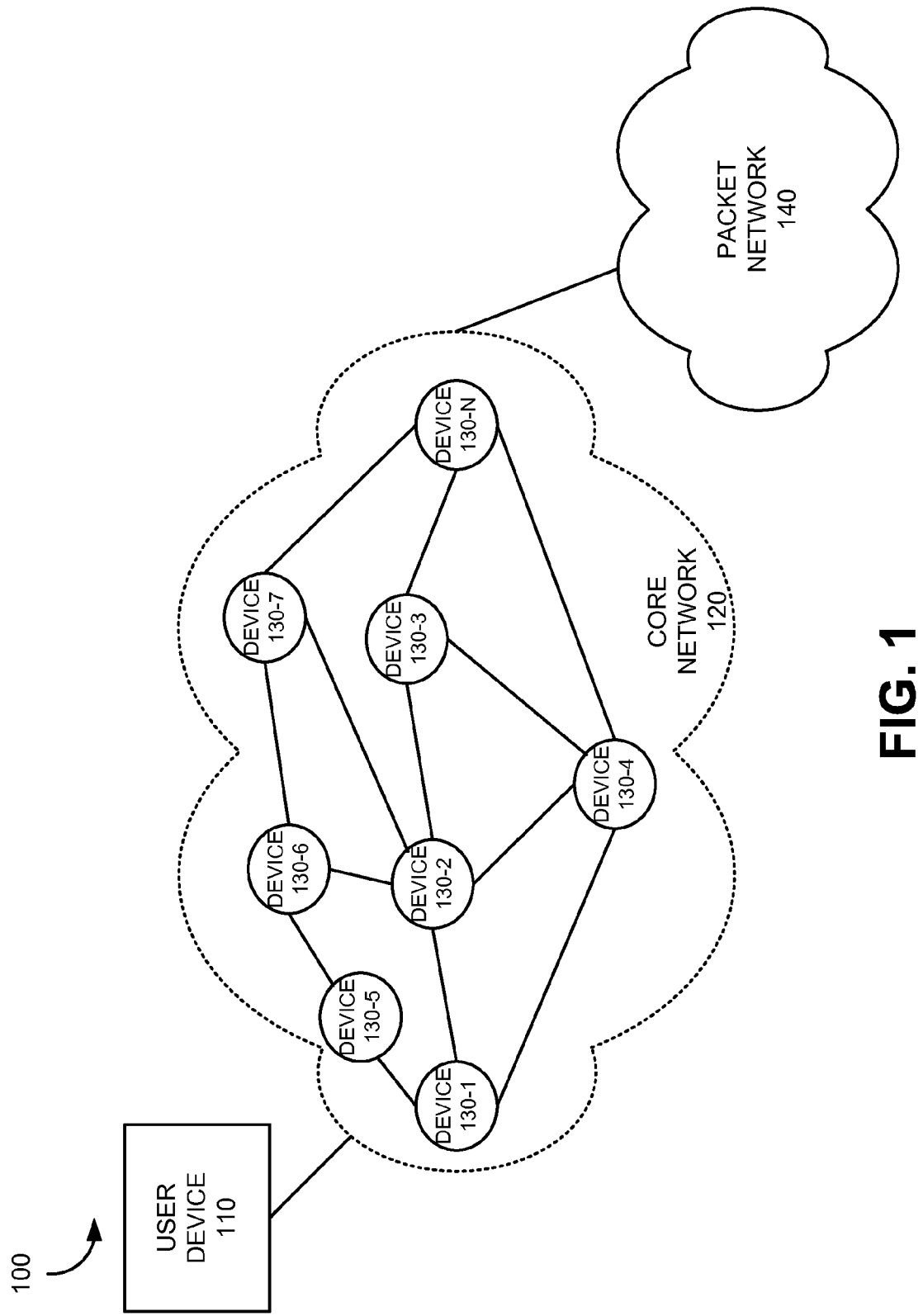
FIG. 1 is a diagram of an example environment in which systems and/or methods described herein may be implemented.

FIG. 1 is a diagram of an example environment 100 in which systems and/or methods described herein may be implemented. Environment 100 may include a user device 110, a core network 120 (e.g., with a plurality of network devices 130-1 through 130-N), and a packet network 140. While FIG. 1 shows a particular number and arrangement of elements, environment 100 may include additional, fewer, different, and/or differently arranged elements than are illustrated in FIG. 1. Alternatively, or additionally, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include any device capable of transmitting data to and/or receiving data from network 120. User device 110 may include any computation or communication device, such as a mobile communication device that is capable of communicating via network 120. In one implementation, user device 110 may include a radiotelephone, a personal communications system (PCS) terminal (e.g., that may combine a cellular radiotelephone with data processing and data communications capabilities), a smart phone, a personal digital assistant (PDA), a mobile telephone device, a laptop, a handheld computer, a tablet computer, a personal media player, etc. User device 110 may connect to network 120 directly or indirectly through a router, a switch, a bridge, a firewall, a gateway, etc. User device 110 may establish a communication session with core network 120. User device 110 may use the session to transmit packets to packet network 140 and to receive packets from packet network 140.

Core network 120 and packet network 140 may represent a single network, multiple networks of a same type, or multiple networks of different types. For example, core network 120 and/or packet network 140 may include a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof. Core network 120, for example, may represent elements in a wireless core network designed to provide wireless telecommunication access to user device 110. Packet network 140 may include, for example, a public packet-based network, such as the Internet. Packet network 140 may also refer to one or more servers/ devices that provide web services, to user device 110, via packet network 140.

Network 120 may include network devices 130-1, 130-2, . . . , 130-N (collectively referred to as "devices 130" and individually as "device 130"). Devices 130 may connect via a number of network links. The network links may include wired and/or wireless links. Each device 130 may connect to one or more other devices 130. While FIG. 1 shows a particular number and arrangement of devices 130, network 120 may include additional, fewer, different, or differently arranged devices 130 than are illustrated in FIG. 1.

Device 130 may include any network device that transmits and/or facilitates transmission of data traffic/packets from user device 110 to packet network 140 and from packet network 140 to user device 110. For example, device 130 may take the form of a routing device (e.g., a router, such as an Ethernet service router), a switching device, a multiplexing device, or a device that performs a combination of routing, switching, and/or multiplexing functions. In one implementation, device 130 may be a digital device. In another implementation, device 130 may be an optical device. In yet another implementation, device 130 may be a combination of a digital device and an optical device.

Devices 130 may include one or more of a radio access node (such as a base station or eNodeB), a packet data network gateway (PGW), and a policy charging and rules function (PCRF) server, and/or one or more other types of devices that make up different types of core networks. Devices 130 may provide connectivity to external networks, such as packet network 140. If device 130 corresponds to a PGW, device 130 may perform policy enforcement, packet filtering for each user, charging support, lawful interception, packet screening, and/or one or more NAT functions.

Device 130 may represent an NAT device. Device 130 may perform NAT functions in response to receiving a packet from user device 110. Device 130 may, for instance, allocate user device 110 an IP address (e.g., 172.16.254.1) and a port range (e.g., 0-499) that user device 110 may use in subsequent communications with packet network 140. Device 130 may assist in the NAT functions by, for example, providing valid network addresses, port blocks, and/or other necessary information to one or more other devices 130.

After the IP address and the port range are allocated, device 130 may receive a packet from packet network 140 that is addressed to the allocated IP address. Device 130 may determine that user device 110 should receive the packet because the response is associated with a port (e.g., 250) that is within the port range allocated to user device 110. Accordingly, device 130 may forward the packet received from packet network 140, based on both the IP address and the port number associated with the packet. Thus, for example, device 130 may forward packets that are destined for port 250 and IP address 172.16.254.1 to user device 110.

Figure 2:
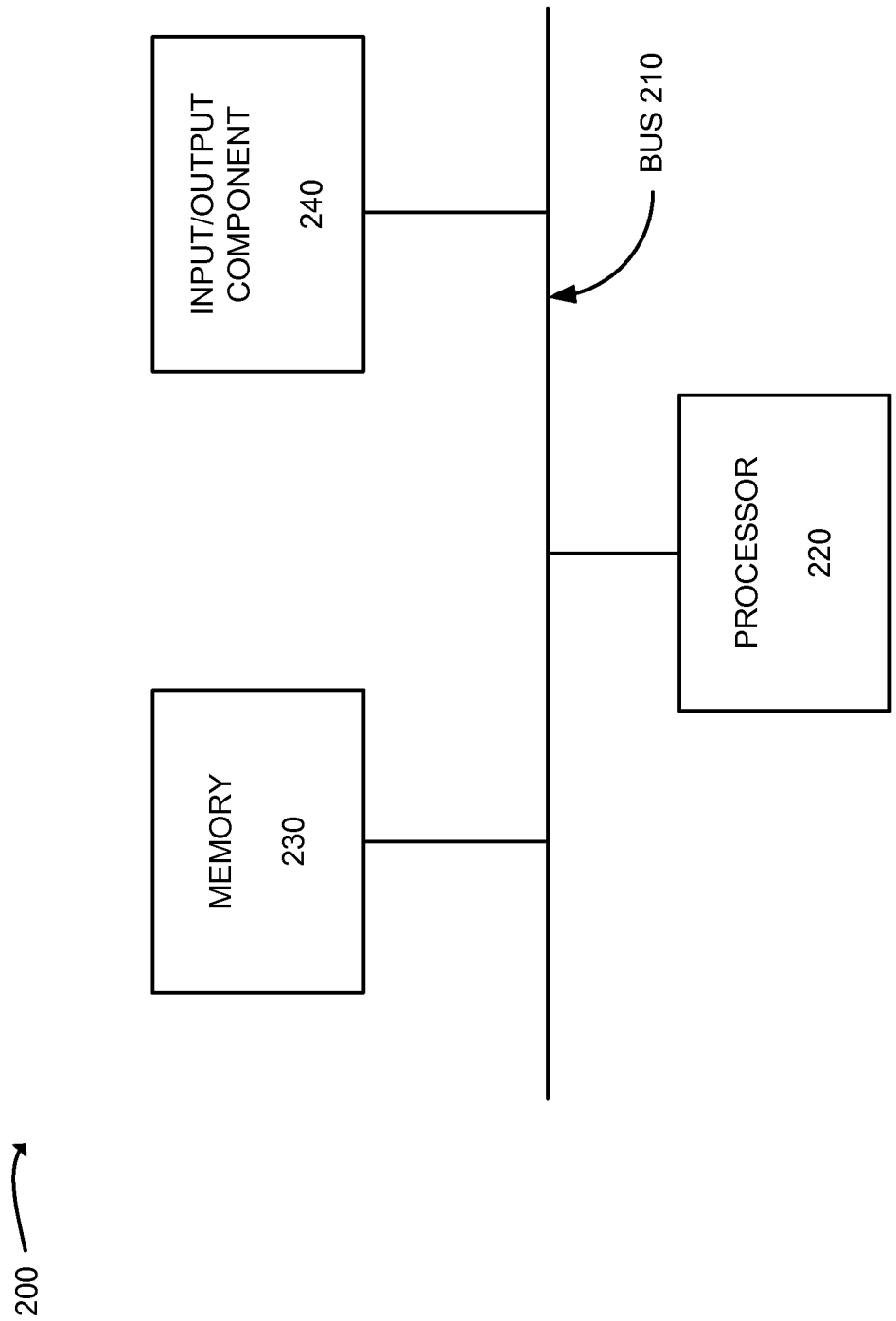
FIG. 2 is a diagram of example components of one or more devices of FIG. 1.

FIG. 2 is a diagram of example components of a device 200, which may correspond to user device 110 and/or device 130. Each one of user device 110 and/or device 130 may include one or more devices 200 and/or one or more of each one of the components of device 200. As shown in FIG. 2, device 200 may include a bus 210, a processor 220, a memory 230, and an input/output component 240.

Although FIG. 2 illustrates example components of device 200, in other implementations, device 200 may include additional components, fewer components, different components, or differently arranged components than those illustrated in FIG. 2 and described herein. Alternatively, or additionally, one or more components of device 200 may perform one or more other tasks described as being performed by one or more other components of device 200.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Memory 230 may include a random access memory (RAM) or another type of dynamic storage device that may store information and instructions for execution by processor 220; a read only memory (ROM) or another type of static storage device that may store static information and instructions for use by processor 220; a magnetic and/or optical recording medium and its corresponding drive; and/or a removable form of memory, such as a flash memory.

Input/output component 240 may include a mechanism that permits an operator to input information to device 200, such as a keyboard, a keypad, a mouse, a button, a pen, a touch screen, etc., and/or a mechanism that outputs information to the operator, including a display, a light emitting diode (LED), a speaker, etc. Additionally, or alternatively, input/ output component 240 may include any transceiver-like mechanism that enables device 200 to communicate with other devices and/or systems. For example, input/output component 240 may include a wired interface (e.g., an Ethernet interface, an optical interface, etc.), a wireless interface (e.g., a radio frequency (RF) interface, a wireless fidelity (Wi-Fi) interface, a Bluetooth interface, etc.), or a combination of a wired interface and a wireless interface.

As will be described in detail below, device 200 may perform certain operations. Device 200 may perform these and other operations in response to processor 220 executing software instructions (e.g., computer program(s)) contained in a computer-readable medium, such as memory 230, a secondary storage device (e.g., hard disk, CD-ROM, etc.), etc. A computer-readable medium may be defined as a non-transitory memory device. A memory device may include a space within a single physical memory device or spread across multiple physical memory devices. The software instructions may be read into memory 230 from another computer-readable medium or from input/output component 240. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
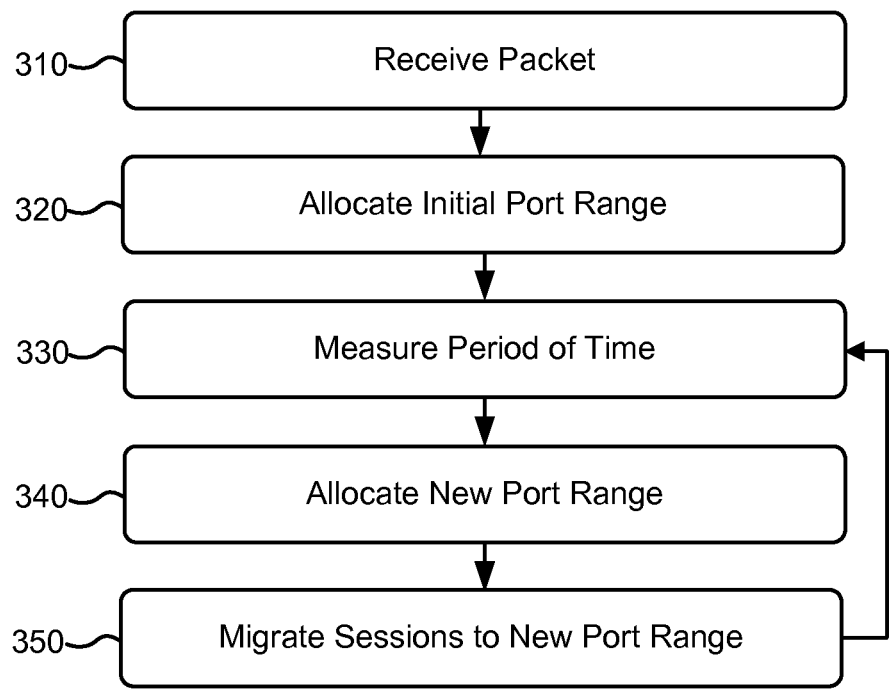
FIG. 3 is a flowchart of an example process for allocating port ranges.

FIG. 3 is a flowchart of an example process 300 for allocating port ranges. In one example implementation, device 130 may perform process 300. Alternatively, process 300 may be performed by one or more other devices, alone or in combination with device 130.

Prior to process 300, a network administrator, associated with device 130, may provide inputs to set a length of a particular period of time and/or a port range size, as described further below. The particular time period may specify an amount of time after which a new port range needs to be allocated. The port range size may specify a quantity of ports that are to be allocated to an individual subscriber (e.g., to a user device associated with the individual subscriber) in a contiguous range. Device 130 may set (the length of) the particular period of time and/or the port range size, based on the inputs. During process 300, the network administrator may provide new inputs to change values of the particular period of time and/or the port range size. Device 130 may change the values of the particular period of time and/or the port range size, based on the new inputs, during or after process 300.

As shown in FIG. 3, process 300 may include receiving a packet (block 310). For example, user device 110, when accessing packet network 140, may transmit a packet to core network 120. Device 130, of core network 120, may receive the packet. The packet may include information associated with user device 110, such as a device identifier (e.g., a mobile director number (MDN), a media access control (MAC) address, etc.) and/or a physical device identifier (e.g., an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), etc.).

Process 300 may further include allocating an initial port range (block 320). For example, device 130 may use NAT to allocate an initial port range to user device 110. To do so, device 130 may determine the port range size (e.g., 500) that is set by the network administrator of core network 120. The network administrator may increase the port range size to increase security. The network administrator may decrease the port range size to increase a quantity of subscribers (e.g., user devices) that may share a single IP address. After determining the port range size, device 130 may determine (e.g., look-up in a table that indicates available port ranges) an available contiguous range of ports that includes a quantity of ports equal to the port range size. Device 130 may allocate the available contiguous range of ports (e.g., 2000-2499) as the initial port range for user device 110. The initial port range may be associated with a particular IP address Process 300 may include measuring a period of time (block 330). For example, device 130 may determine a particular time period (e.g., 30 minutes) that is set by the network administrator of core network 120. The network administrator may decrease the particular time period to increase the security. The network administrator may increase the particular time period to decrease an amount of binding information that needs to be stored. After determining the particular time period, device 130 may measure a period of time starting at a point in time when device 130 allocates the initial port range (block 320).

Process 300 may also include allocating a new port range (block 340). For example, device 130 may determine whether the measured period of time is equal to the particular period of time. When device 130 determines that the measured period of time is equal to the particular time period, device 130 may proceed to allocate a new port range. To do so, device 130 may determine (e.g., look-up in a table that indicates available port ranges) an available contiguous range of ports that includes a quantity of ports equal to the port range size. Device 130 may allocate the available contiguous range of ports (e.g., 2500-2999) as the new port range for user device 110. In one implementation, the new port range may be associated with the same particular IP address that is associated with the initial port range. In another implementation, the new port range may be associated with a different IP address.

Process 300 may also include migrating sessions to the new port range (block 350). For example, after device 130 allocates the new port range (block 340), device 130 may determine that ports of the initial port range, which were previously used to establish sessions between user device 110 and packet network 140 are no longer in use. Device 130 may release those ports of the initial port range. Simultaneously, device 130 may use ports of the new port range to create new sessions between user device 110 and packet network 140. Eventually, sessions associated with user device 110 migrate from the initial new port range to the new port range. When device 130 releases all ports of the initial port range, device 130 may release the initial port range. Thereafter, the initial port range may be allocated to a different user device. In another implementation, a portion of the initial port range may be allocated to the different device (e.g., as part of a range that is different from the initial port range). Device 130 may only use ports of the new port range to connect, via packet network 140, user device 110 to web services until a different new port range is allocated as described further below.

Device 130 may restart measuring of a period of time (block 330) at a point in time when device 130 allocates the new port range (block 340). When device 130 determines that the measured period of time again equals the particular time period, device 130 may proceed to allocate a different new port range (block 350), which is different from the previously allocated new port range that is currently allocated to user device 110.

Device 130 may also migrate sessions from the previously allocated new port range to the newly allocated port range. A portion of process 300, described in reference to blocks 330-350, may continue to repeat until user device 110 disconnects from core network 120 or packet network 140. User device 110 may disconnect from core network 120 when, for example, user device 110 actively disconnects its connection to core network 140, a timeout of a user device 110 occurs (e.g., no communication with user device 110 for a certain time period), or device 130 determines to unilaterally disconnect user device 110. After device 130 determines that user device 110 is disconnected from core network 120, device 130 may release all sessions associated with user device 110. Releasing all sessions may include deallocating all ports/port ranges that were previously allocated to user device 110.

FIGS. 4A-4C are diagrams illustrating an example table 400 that indicates which port ranges are allocated. In one implementation, device 130 may maintain table 400. For example, device 130 may update table 400 when port ranges are allocated and/or when port ranges are released, as described above with reference to FIG. 3.

As shown in FIGS. 4A-4C, table 400 may include an IP address field 410, a start port range field 420, an end port range field 430, and a status field 440. Although in FIGS. 4A-4C illustrate example fields of table 400, in other implementations, table 400 may include additional fields, fewer fields, different fields, or differently arranged fields than those illustrated in FIGS. 4A-4C and described herein.

Here, table 400 may represent available port ranges for different IP addresses. In another implementation, device 130 may maintain tables that represent available port ranges for single IP addresses. Separate instances of the tables may be implemented for each IP address in the IP address pool.

Assume that a network administrator of core network 120, which is associated with table 400, sets a port range size of five hundred (500). Status field 440 may indicate, for each entry, a current status of a port range. The current status may include "allocated" or "not allocated." Each allocated entry of table 400 may correspond to five hundred (500) ports, of a particular IP address, which are allocated.

In the example shown in FIG. 4A, a first entry, of table 400, corresponds to an IP address 172.16.254.1 (field 410), a starting port range value of 2000 (field 420), and an ending port range value of 2499 (field 430). A second entry, of table 400, corresponds to an IP address 172.16.254.1 (field 410), a starting port range value of 2500 (field 420), and an ending port range value of 2999 (field 430).

A third entry, of table 400, corresponds to an IP address 172.16.254.1 (field 410), a starting port range value of 3000 (field 420), and an ending port range value of 3499 (field 430). A fourth entry, of table 400, corresponds to an IP address 172.16.254.1 (field 410), a starting port range value of 3500 (field 420), and an ending port range value of 3599 (field 430). A fifth entry, of table 400, corresponds to an IP address 172.16.254.2 (field 410), a starting port range value of 2000 (field 420), and an ending port range value of 3600 (field 430).

Assume that device 130 receives a packet from user device 110, as described above in reference to block 310 of FIG. 3. Device 130 may allocate port range 2000-2499, associated with IP address 172.16.254.1, to user device 110. Accordingly, device 130 may update the current status (field 440) of the first entry to indicate that port range 2000-2499 is "allocated" to user device 110. Device 130 may determine based on the current status of the first entry that ports in port range 2000-2499 are unavailable for allocation to other user devices. The other entries shown in table 400, however, are illustrated as including the status value "not allocated," indicating that these port ranges may be available to be allocated to the other user devices.

Thereafter, device 130 may measure and determine that a particular period of time has elapsed, as described above in reference to block 340 of FIG. 3. In response, device 130 may use table 400 to randomly select any port range that includes 500 ports, which are not allocated. For example, device 130 may select and allocate a new port range 3000-3499, associated with IP address 172.16.254.1, to user device 110. Accordingly, device 130 may update table 400 by changing the current status field of the third entry from "not allocated" (FIG. 4A) to "allocated" (FIG. 4B).

Thereafter, device 130 may migrate all sessions used by user device 110, to communicate via packet network 140, from port range 2000-2499, associated with IP address 172.16.254.1, to port range 3000-3499, associated with IP address 172.16.254.1, as described above in reference to block 370 of FIG. 3. Once the migration is complete (i.e., all the sessions are migrated from port range 2000-2499 to port range 3000-3499), device 130 may update table 400 by changing the current status field of the first entry from "allocated" (FIGS. 4A and 4B) to "not allocated" (FIG. 4C). Thereafter, one of devices 130 may allocate port range 2000-2499, associated with IP address 172.16.254.1, to a different user device.

The foregoing description of implementations provides illustration and description, but is not intended to be exhaustive or to limit the implementations to the precise form disclosed. Modifications and variations are possible in light of the above teachings or may be acquired from practice of these implementations.

For example, while a series of blocks has been described with regards to FIG. 3, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    allocating, by a network device, a first port range to a user device, the first port range being associated with a first Internet Protocol (IP) address;
    establishing, by the network device and after allocating the first port range, sessions by using first ports of the first port range;
    measuring, by the network device, a period of time after allocating the first port range;
    determining, by the network device, that the measured period of time is equal to a particular period of time;

selecting, by the network device, a second port range based on determining that the measured period of time is equal to the particular period of time;
allocating, by the network device, the second port range to the user device; and
migrating, by the network device and after allocating the second port range, at least one of the sessions from the first ports of the first port range to second ports of the second port range.

2. The method of claim 1, further comprising:
where the second port range is associated with a second IP address, and
where the second IP address is different from the first IP address.

3. The method of claim 1, further comprising:
determining the particular period of time based on an input provided by a network administrator,
measuring the period of time including:
measuring the period of time from a point in time when the first port range is allocated.

4. The method of claim 1, further comprising:
measuring a second period of time after allocating the second port range;
determining that the second period of time is equal to the particular period of time; and
allocating a third port range to the user device based on determining that the second period of time is equal to the particular period of time.

5. The method of claim 1, further comprising:
releasing, after allocating the second port range, one or more other first ports of the first port range when the network device determines that one or more other sessions, that were created between the user device and a packet network, are no longer in use, and
using one or more other second ports of the second port range to create new sessions between the user device and the packet network.

6. The method of claim 1, further comprising:
setting a length of the particular period of time based on an input of a network administrator associated with the network device.

7. The method of claim 1, further comprising:
setting a port range size based on an input of a network administrator associated with the network device,
the first port range being of the port range size,
the second port range being of the port range size, and
the port range size specifying a quantity of ports that are to be allocated to an individual subscriber in a contiguous range.

8. The method of claim 1, where selecting the second port range comprises:
randomly selecting the second port range from a plurality of port ranges that are not allocated.

9. A non-transitory computer-readable medium storing instructions, the instructions comprising:
one or more instructions that, when executed by at least one processor, cause the at least one processor to:
allocate, to a device, a first port range that is associated with a first Internet protocol (IP) address;
measure a period of time from a point in time when the first port range is allocated to the device;
establish sessions by using first ports of the first port range;
determine that the period of time is equal to a particular period of time;
allocate, to the device, a second port range that is associated with a second IP address based on determining that the measured period of time is equal to the particular period of time,
the second IP address being different from the first IP address; and
migrate at least one of the sessions from the first ports of the first port range to second ports of the second port range.

10. The non-transitory computer-readable medium of claim 9, where the instructions further comprise:
one or more instructions that, when executed by the at least one processor, cause the at least one processor to:
determine the particular period of time based on an input provided by a network administrator.

11. The non-transitory computer-readable medium of claim 9, where the instructions further comprise:
one or more instructions that, when executed by the at least one processor, cause the at least one processor to:
measure a different period of time from a point in time when the second port range is allocated;
determine that the different period of time is equal to the particular period of time; and
allocate a third port range to the device based on determining that the different period of time is equal to the particular period of time.

12. The non-transitory computer-readable medium of claim 9, where the one or more instructions to allocate the second port range comprise:
one or more instructions that, when executed by the at least one processor, cause the at least one processor to:
determine a port range size, and
select the second port range based on the port range size,
the second port range being a contiguous range of ports that includes a quantity of ports equal to the port range size.

13. The non-transitory computer-readable medium of claim 9, where the instructions further comprise:
one or more instructions that, when executed by the at least one processor, cause the at least one processor to:
allocate a third port range, associated with the first IP address, to a different device;
measure a different period of time from a different point in time when the third port range is allocated to the different device;
determine that the different period of time is equal to the particular period of time; and
allocate a fourth port range to the different device based on determining that the different period of time is equal to the particular period of time.

14. The non-transitory computer-readable medium of claim 13, where a size of the fourth port range is equal to a size of the second port range.

15. The non-transitory computer-readable medium of claim 9, where the instructions further comprise:
one or more instructions that, when executed by the at least one processor, cause the at least one processor to:
update a table to indicate that the first port range is not allocated to the device after migrating the at least one of the sessions from the first ports of the first port range to the second ports of the second port range.

16. A device comprising:
a memory to store information identifying a particular period of time; and
a processor to:
  allocate a first port range to a user device,
  measure a period of time from a point in time when the first port range is allocated to the user device,
  establish, after allocating the first port range, sessions by using first ports of the first port range;
  determine that the measured period of time is equal to the particular period of time,
  select a second port range based on determining that the measured period of time is equal to the particular period of time,
    the second port range being different from the first port range;
  allocate the second port range to the user device; and
  migrate, after allocating the second port range, at least one of the sessions from the first ports of the first port range to second ports of the second port range.

17. The device of claim 16, where the processor is further to:
  update a table to indicate that the second port range is allocated to the user device after allocating the second port range.

18. The device of claim 16, where the processor is further to:
  receive, from the user device, a packet before allocating the first port range to the user device.

19. The device of claim 18, where, when allocating the first port range, the processor is to:
  use, based on the packet, network address translation (NAT) to allocate the first port range.

20. The device of claim 18,
  where the memory further stores information identifying a port range size,
  where a first quantity of the first ports is equal to the port range size, and
  where a second quantity of the second ports is equal to the port range size.

* * * * *